2,711,912

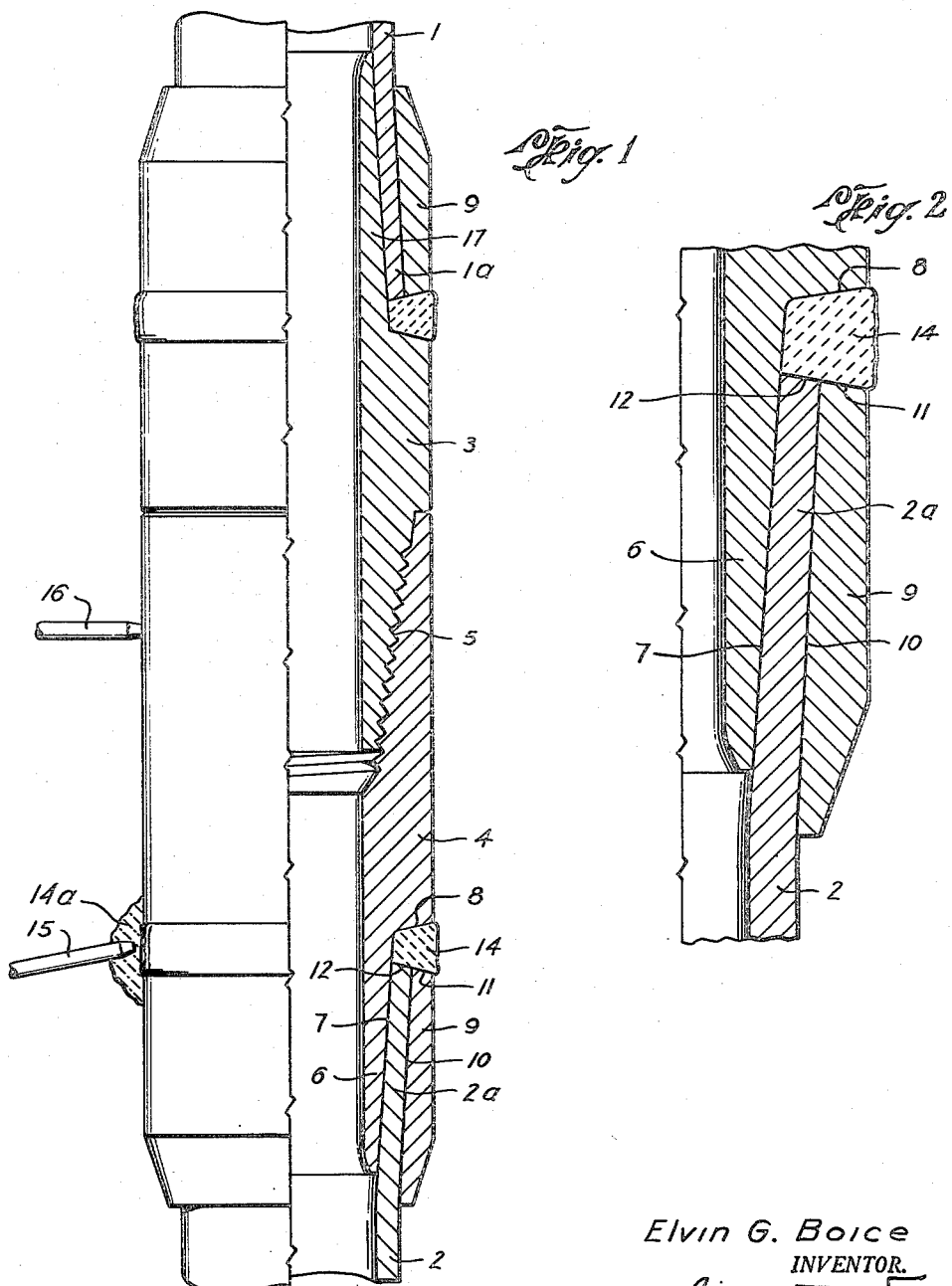

REINFORCED WELDED PIPE JOINT

Elvin G. Boice, Houston, Tex., assignor to Reed Roller Bit Company, Houston, Tex., a corporation of Texas Application October 16, 1950, Serial No. 190,275

5 Claims. (Cl. 285—115)

This invention relates to reinforced welded pipe joints.

The conventional drill stem comprises a number of sections of drill pipe connected together by tool joints. The conventional tool joint includes two members, one known as a box member and the other as a pin member. The box member is secured to one end of each drill pipe section and the pin member to the other end. The pin and box members are provided with threads whereby the members may be readily connected and disconnected from each other to assemble and disassemble the drill stem.

The present invention has for one of its general objects the provision of a new and improved tool joint and a method of securing the pin and box members thereof to the ends of the drill pipe.

A specific object of the invention is to reduce the cost of drill stems by providing a new and improved tool joint and method of securing the same to "plain end" drill pipe—that is, pipe having ends not specially threaded, upset or otherwise prepared for connection to a tool joint.

Another specific object of the invention is to provide a new and improved tool joint and method of applying the same to a drill pipe which will provide a strong and durable connection between the two capable of withstanding the great strains to which they are subjected in deep well drilling.

Other objects will hereinafter appear.

The preferred embodiment of the invention is illustrated in the accompanying drawing in which Fig. 1 is a partly sectional elevation of my new and improved tool joint connecting two sections of drill pipe together, and Fig. 2 is an enlarged detail view illustrating the union of the body of the tool joint, the pipe and the collar.

In the drawings, one section of drill pipe is indicated by the numeral 1 and the other section by the numeral 2. The pin member of my new and improved tool joint is indicated by the numeral 3 and the box member by the numeral 4, said members being connected together by conventional threads 5.

Referring to the box member 4, it will be noted that this member has a reduced end 6 the outer surface of which is tapered toward the drill pipe 2. The numeral 8 indicates the shoulder formed by the reduction of the end 6 of this member. The shoulder 8 may be tapered inwardly as shown. The numeral 9 indicates a collar having a tapered inner surface 10. The end 11 of the collar 9 and the end 12 of the pipe 2 may be tapered inwardly to provide with the shoulder 8 an inwardly tapering trough for the reception of the welding material 14.

The numeral 15 indicates an electrode submerged in the flux 14-a and the numeral 16 the other electrode connected to the joint, to illustrate the use of well known submerged arc welding, in the assembly of the parts provided by my invention.

Referring now in greater detail to the preferred embodiment of my new and improved tool joint and to the method of applying the same to the drill pipe:

The end 2-a of the plain end pipe 2 is flared substantially as shown in the drawings. The end 2-a may be so flared that it will snugly fit the tapered surface 7 of the reduced end 6 of the joint member 4 when in the position shown by the drawings, in which event the reduced end 6 of the member 4 may be inserted in the flared end 2-a of the pipe 2 by hand. The flared end 2-a of the pipe 2 may be so flared that its normal internal diameter will be somewhat smaller, in which event the reduced end 6 may be forced by machine into the end 2-a to the position shown by the drawings to provide a very tight initial engagement thereof. The end 2-a of the pipe may be heated and while it is hot the end 6 of the joint 4 may be inserted in the end 2-a, in which event the pipe end 2-a will provide an initial shrink grip on the end 6 of the joint.

The collar 9 is placed on the pipe 2 before the end 2-a of the pipe is flared, and after the end 6 of the joint has been inserted in the flared end 2-a of the pipe, the collar 9 may be moved along the body of the pipe 2 upon the flared end 2-a of the pipe substantially to the position shown in the drawings. Since when the end 2-a of the pipe is flared it will occupy an area greater than the area it originally occupied when it constituted the cylindrical end of the pipe, the width or thickness of the end 2-a will decrease from the body of the pipe 2 to the extremity of the end 2-a. To enable the collar 9 to snugly engage the end 2-a, the internal surface 10 of the collar 9 may for this reason be tapered at an angle slightly different from the angle of the taper of the surface 7 of the joint end 6. For example, the taper of the surface 7 of the end 6 of the joint may be 3 degrees 30 minutes and the taper of the internal surface 10 of the collar 9 may be 3 degrees. The collar 9 may be so constructed that it will initially snugly fit the end 2-a of the pipe so thta it can be moved into substantially the position shown by hand; it may be made to fit so tightly that it must be forced by machine into substantially the position shown by the drawings; and it may be heated and then moved substantially into the position shown by the drawings to provide a shrink grip on the end 2-a of the pipe when it cools.

The welding material 14 may be applied in the circumferential trough defined by the walls 8 and 11 in any conventional manner. Submerged arc welding may readily be employed by placing the flux in and about the trough defined by the walls 8 and 11 as indicated at 14-a, whereupon the electrode 16 having been electrically connected to the joint, the electrode 15 may be submerged in the flux and moved in a circle around the joint, or the electrode 15 may be held stationary and the joint rotated to effect the welding of the parts together. The construction and method are such that conventional submerged arc welding may be readily employed to effect the desired welding.

In the event a very tight initial fit of the end 6 of the member 4 in the end 2-a of the pipe 2, and of the collar 9 on the pipe end 2-a is desired, any suitable means may be employed to exert a pressure on the parts to force them into substantially the positions shown by the drawings. For example, a jig may be employed to exert a pressure of say 10,000 pounds, and the welding operation may be carried on while this force is being applied. The extremities 11 and 12 of the collar 9 and pipe end 2-a may be machined after the parts have been forced together, to provide a smooth side wall for the welding groove a predetermined distance from the shoulder 8. Thus machining the extremities 11 and 12 of the collar and pipe will permit a less accurate manufacture of the end of the member, the pipe end and the collar because if the extremities 11 and 12 are machined it is not necessary that when the parts are forced together they assume exactly the desired positions for the welding operation.

When the weld 14 cools, the resulting contraction causes an additional movement of the collar 9 and the pipe end 2–a toward the shoulder 8 to provide a tighter engagement of the parts and a wider distribution of stresses.

It will be apparent from the foregoing that in the preferred embodiment the joint end 6, the pipe end 2–a and the collar 9 are all welded together by the weld 14. This provides a very strong construction, and the method of making it is relatively simple and inexpensive.

It will also be noted that in the preferred embodiment the external diameter of the collar 9, and of the body of the joint 4 are substantially the same which is an important advantage for reasons which will be apparent to those skilled in the art of which may be mentioned the fact that no obstruction is offered to the downward and upward movement of the drill stem in the well.

The collar 9 forms the tool joint shoulder and may be constructed with tapered elevator shoulders or square shoulders, and with or without hard metal bands. By selecting different types of collars many various combinations can be supplied for a string of drill pipe without changing the assembly procedure above described.

It will be understood that the end 1–a of the pipe section 1 is flared and connected to the pin member 3 the same as is the end 2–a of the pipe section 2 to the box member 4. The reduced end 17 of the pin member 3 is the same as the reduced end 6 of the box member 4.

The invention is not limited to the preferred embodiment of the invention or to the preferred steps or sequence of steps of the method hereinabove set forth. Various changes will be apparent to those skilled in the art.

I claim:

1. The combination of a drill pipe having a flared end, a tool joint member having a reduced tapered end with the free end portion thereof fitting in the flared end of said pipe, a collar having an inwardly tapered surface fitting on the flared end of said pipe, the flared end of the pipe being tightly clamped between the free end portion of said member and said collar, the tapered surfaces of the said end of said member and said collar converging slightly toward the shoulder of said member formed by the reduction of the end of said member to engage the end of said pipe, said shoulder being tapered inwardly and the adjacent extremities of said pipe and collar being substantially flush and axially spaced from said shoulder and tapered inwardly to form with said shoulder and the body of said member an outwardly open circumferential trough for the reception of welding material, and welding material in said trough uniting together said shoulder, the body of said member, and the ends of said pipe and collar, the outer surface of said collar being substantially flush with the outer surface of said member.

2. The combination of a drill pipe having a flared end, a tool joint member having a reduced tapered end with the free end portion thereof fitting in the flared end of said pipe, a collar having an inwardly tapered surface fitting on the flared end of said pipe, the flared end of the pipe being tightly clamped between the free end portion of said member and said collar, the tapered surfaces of the said end of said member and said collar converging slightly toward the shoulder of said member formed by the reduction of the end of said member to engage the end of said pipe, the ends of said pipe and collar being substantially flush and axially spaced from said shoulder thereby forming with said shoulder and the body of said member an outwardly open circumferential trough for the reception of welding material, and welding material in said trough uniting together said shoulder, the body of said member, and the ends of said pipe and collar, the outer surface of said collar being substantially flush with the outer surface of said member.

3. The combination of a drill pipe having a flared end, a tool joint member having a reduced tapered end with the free end portion thereof fitting in the flared end of said pipe, a collar having an inwardly tapered surface fitting on the flared end of said pipe, the flared end of the pipe being tightly clamped between the free end portion of said member and said collar, the ends of said pipe and collar being substantially flush and axially spaced from said shoulder thereby forming with the shoulder formed by the reduction of the end of said member an outwardly open circumferential trough for the reception of welding material, and welding material in said trough uniting together said shoulder and the ends of said pipe and collar.

4. The combination as set forth in claim 3 in which the outer surface of said collar is substantially flush with the outer surface of said member.

5. The combination as set forth in claim 3 in which said member and collar are of substantially the same external diameter and in which said welding material fills said trough.

References Cited in the file of this patent

UNITED STATES PATENTS

| Number | Name | Date |
|---|---|---|
| 1,360,897 | Dailey | Nov. 30, 1920 |
| 1,594,579 | Timbs et al. | Aug. 3, 1926 |
| 2,820,069 | Herr | Aug. 25, 1931 |
| 1,934,022 | Wiggins | Nov. 7, 1933 |
| 1,935,425 | Wiggins | Nov. 14, 1933 |
| 2,003,488 | Hook | June 4, 1935 |
| 2,217,090 | Zerbe | Oct. 8, 1940 |
| 2,233,455 | Larson | Mar. 4, 1941 |
| 2,301,495 | Abegg | Nov. 10, 1942 |
| 2,332,354 | Stecher | Oct. 19, 1943 |
| 2,404,142 | Parker | July 16, 1946 |
| 2,535,320 | Richardson | Dec. 26, 1950 |
| 2,539,056 | Brown | Jan. 23, 1951 |
| 2,539,057 | Brown | Jan. 23, 1951 |